April 27, 1954 — R. B. BASHAM — 2,676,489
APPARATUS FOR MEASURING TEMPERATURE IN BOREHOLES
Filed Oct. 2, 1950 — 2 Sheets-Sheet 1

RAYMOND B. BASHAM
Inventor

By Herbert J. Brown
Attorney

RAYMOND B. BASHAM
Inventor

By Herbert J. Brown
Attorney

Patented Apr. 27, 1954

2,676,489

UNITED STATES PATENT OFFICE 2,676,489

APPARATUS FOR MEASURING TEMPERATURE IN BOREHOLES

Raymond B. Basham, Fort Worth, Tex., assignor to Westronics, Inc., Fort Worth, Tex., a corporation of Texas Application October 2, 1950, Serial No. 188,027

3 Claims. (Cl. 73—342)

This invention relates to temperature measuring apparatus for bore holes.

Although apparatus of the described class has been used heretofore for obtaining temperatures at various depths in bore holes, such apparatus has not been entirely satisfactory because of variations encountered in changes affecting electrical equipment not directly due to bore hole temperature variations. For example, slip ring and brush contact resistances vary, and supporting line resistances vary with changes in temperature. Also, the tension applied to the cables cause resistance changes which affected the results and accuracy of the readings. One of the primary purposes of temperature measuring in bore holes is to locate the top of cement around well casing, but after the cement has set for a length of time, the temperature produced by the chemical reaction recedes to such an extent that temperature measuring devices heretofore used would only indicate a slight change in the slope of the gradient. Such slight changes are difficult to define, particularly where other variations in the readings are present. Other inaccuracies were due to the vibration of delicate devices lowered in the bore holes where they were subjected to impact with casing collars and the casing walls.

An object is to provide a highly sensitive and accurate temperature measuring device for bore holes.

Another object of the invention is to provide, in a bore hole temperature measuring device, a circuit whereby two electrical measurements may be made on a single conductor line using the same temperature sensitive element for both measurements, and whereby differential and gradient recording may be correlated and accurately compared.

A further object of the invention is to provide, in that portion of the apparatus lowered in the bore hole, a rugged and relatively simple construction which will withstand shock caused by impact of the same against the well casing and collars.

Another object of the invention is to provide a simple means for supplying an alternating current power source from the earth's surface, rectifying the alternating current within that portion of the device lowered beneath the earth's surface, and wherein the direct current component is proportional to the differential temperature, and the alternating current component is proportional to the absolute temperature, making possible the simultaneous dual recording of the gradient and differential temperatures.

The invention will be more readily understood by reference to the accompanying drawings and the following description of an exemplary form of the invention.

Figures 1, 2, 3:
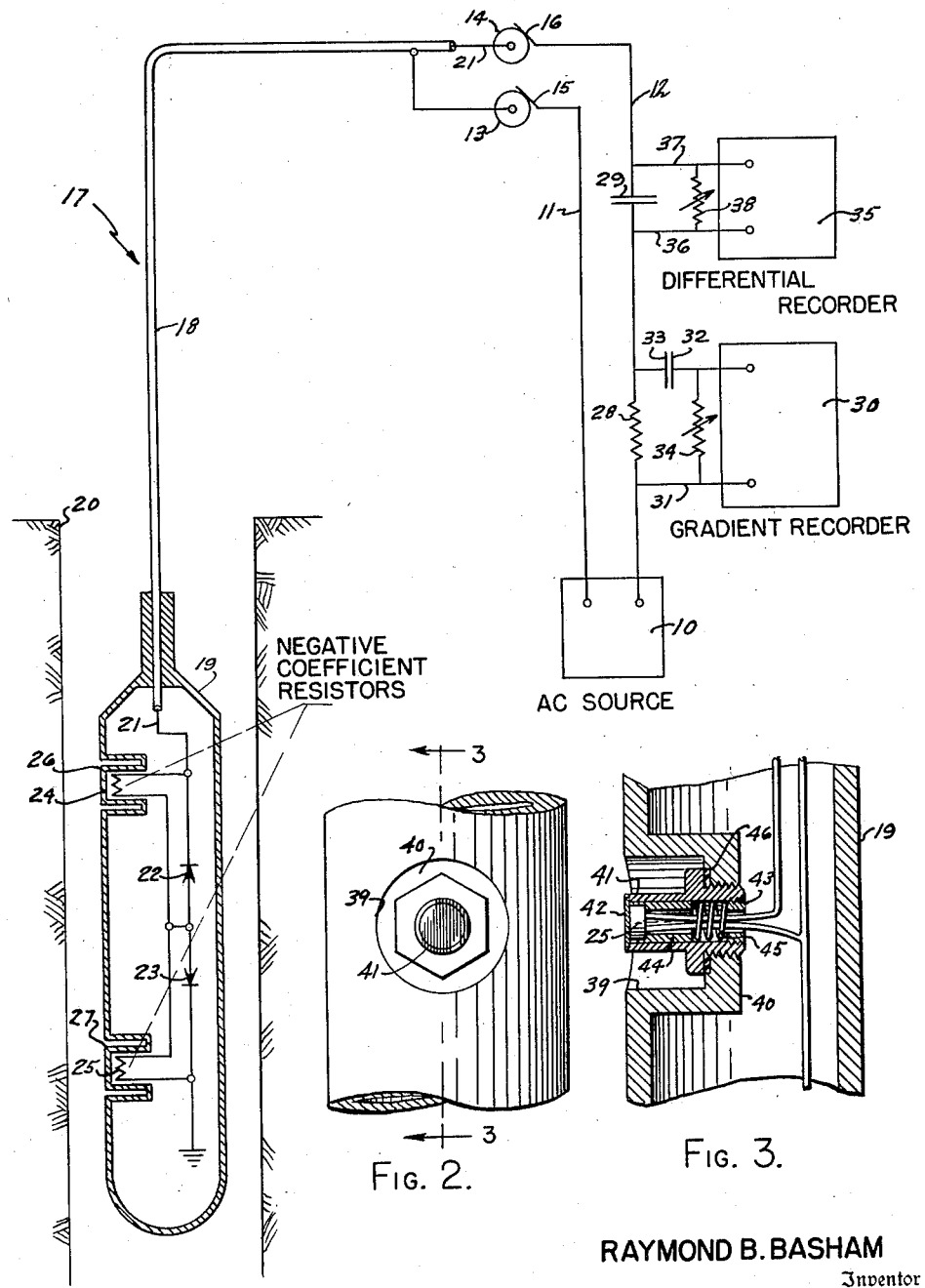
Figure 1 is a schematic and diagrammatic view of the temperature measuring device in accordance with the present invention and showing the housing containing the temperature sensitive elements lowered in a bore hole.
Figure 2 is a broken elevation of the lower portion of the housing and showing a preferred construction for mounting the temperature sensitive elements.
Figure 3 is a vertical sectional view taken on lines 3—3 of Figure 2.

In Figure 1, the numeral 10 designates a source of alternating current which is connected by leads 11 and 12 with slip rings 13 and 14, and is provided with brushes 15 and 16 for making electrical contact with the latter. The slip rings 13 and 14 are connected with a coaxial cable 17, the sheath 18 of which is connected with an elongated tubular housing 19 which is lowered in a bore hole 20 by means of conventional apparatus, not shown. The conductor core 21 of the coaxial cable 17 is connected with opposingly arranged metallic rectifiers 22 and 23 mounted within the housing 19. The metallic rectifiers referred to may be any metallic rectifier having properties similar to copper oxide, selenium, or germanium, and are herein referred to by way of example and not as limitations. The rectifiers 22 and 23 are opposingly arranged and connected in series with each other, and the ends of which are respectively connected with the lead 21 and with the housing 19.

Temperature sensitive elements 24 and 25 are mounted, one above the other within cases 26 and 27 in the wall of the housing 19. The temperature sensitive elements 24 and 25 may be any of the high temperature coefficient resistors, such as the negative coefficient resistors known as semi-conductors, thermo resistors, and thermistors. The upper element 24 is connected in parallel with one of the rectifiers 22, whereas the lower element 25 is connected in parallel with the remaining rectifier 23.

One of the leads 12 from the alternating current source 10 includes a resistor 28 and a bypass condenser 29. A gradient recorder 30 is connected by leads 31 and 32 with the lead 12 on opposite sides of the resistor 28. One of the recorder leads 32 includes a blocking condenser 33, and a variable resistance 34 is connected across the leads 31 and 32 between said condenser and said recorder.

Similarly, a differential recorder 35 is connected by leads 36 and 37 with the lead 12 on opposite sides of the condenser 29, and which last described leads include a variable resistor 38 connected thereacross.

A preferred mounting for the temperature sensitive elements 24 and 25 is shown in Figures 2 and 3 wherein the wall of the housing 19 is provided with an inwardly directed well 39 having a closed end 40. Each mounting is composed of a flanged tubular shell 41, heretofore referred to as cases 26 and 27 in connection with Figure 1, and is threadedly engaged in the well end 40, as shown in detail in Figure 3. The outer end of the shell 41 is closed by means of a relatively thin disk 42 of material having good thermal conductivity, and which disk may be braised or otherwise sealed in place. The thermal sensitive element 24 or 25 is positioned against the inner surface of the disk 42 and is held in place by means of a threaded ring 43 in the inner end of the shell 41, together with a slidable sleeve 44 of insulating material positioned against the element 24 or 25, and having a compression spring 45 positioned between the said threaded ring and said sleeve. A gasket 46 is positioned between the outer surface of the well end 40 and the flange 47 of the shell 41.

In operation, the housing 19 is lowered in the bore hole 20 and when the elements 24 and 25 are subjected to a change in temperature, the absolute temperature is recorded on the gradient recorder and the change in temperature is shown on the differential recorder. By reason of the elements 24 and 25 being spaced one above the other, and by reason of the very high sensitivity of the same, the differential reading on the recorder 35 will indicate minute differences in temperature between as they effect the spaced elements 24 and 25. The alternating current passes alternately through the sensitive elements 24 and 25 since each element is shunted during one-half cycle of alternated current, for example, when the lead 21 is positive with respect to the housing 19, the current will flow through one rectifier 22 and the lower element 25, during which time the element 24 is shunted by the contact rectifier 22 on this half cycle. On the next half cycle the lead 21 will be negative. Current will then flow through the element 24 and the contact rectifier 23, the lower element 25 being shunted by the other contact rectifier 23. If the temperatures of the two elements 24 and 25 are the same, the electrical resistances of both elements will be the same; therefore each half cycle of alternating current flowing through the elements will be the same. The current of the alternating current component will be inversely proportional to the average resistance of the two elements 24 and 25, and will be directly proportional to the average temperature of the two elements. The current of the alternating current component in the lead 12 will cause a voltage drop across the resistor 28, and since this voltage drop is an alternating current, voltage will pass through the blocking condenser 33 and cause a deflection on the gradient recorder 30.

A temperature variation between the two elements 24 and 25 will cause a difference in amplitude of the two half cycles of current passing therethrough. This difference in amplitude will produce an alternating current with a direct current component having a value which is equal to the difference between the two half cycles. Although this direct current component will produce a voltage drop across the resistor 28, it will not deflect the gradient recorder 30 because of the action of the blocking condenser 33. However, the condenser 29 in series with the lead 12 will impose the direct current on the differential recorder 35. The condenser 29 will by-pass the alternating current component, and thus prevent the differential recorder 35 from indicating the alternating current component.

By reason of the characteristics of high temperature coefficient resistors, the change in resistance of either element 24 or 25 is so much greater than the resistance variations in the cable 17 that the percentage of error recorded is negligible. It is also pointed out that the housing does not contain apparatus, such as vacuum tubes, transformer coils and the like which are subject to resistance variations due to change in temperature.

Figure 4:
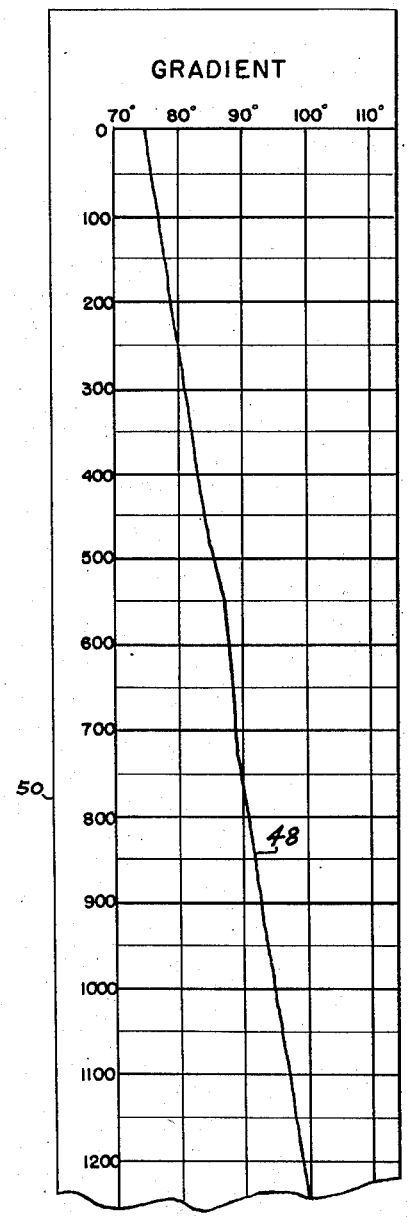
Figure 4 is a typical chart for recording the gradient temperature.
Figure 5:
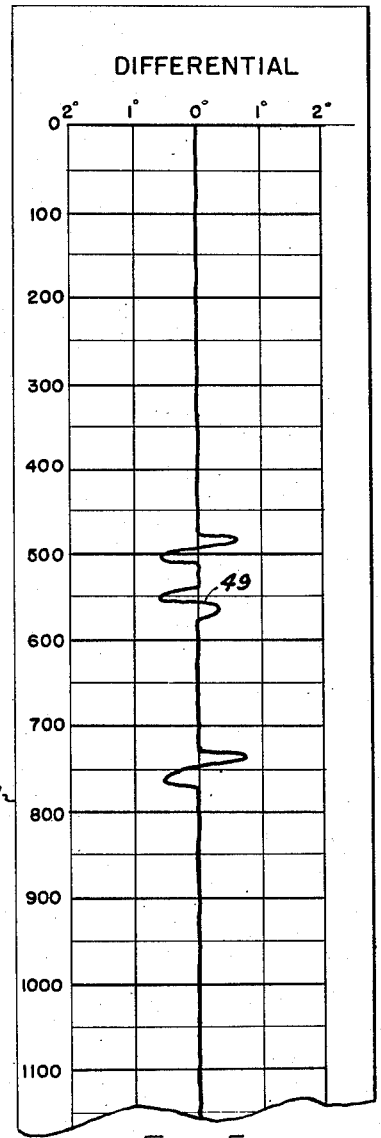
Figure 5 is a typical chart for recording the temperature differentials.

In Figures 4 and 5, the gradient and the differential curves 48 and 49 of the logs of the same length of a well bore are shown, and where it is pointed out that while the gradient curve on the gradient chart 50 includes anomalies indicating changes in temperature, the same variations are accentuated on the differential chart 51. Inasmuch as these two charts 50 and 51 are recorded simultaneously, the anomalies in the gradient chart may be readily correlated with the accentuated curves in the differential chart. A slight change in the slope 48 on the gradient chart 50, may be difficult to define, whereas the corresponding variation on the recorded line 49 in the differential chart 51 will, in most cases, fully explain the slight variations to a person versed in the art. Many variations having little significance may appear on the differential chart 51, but may be identified by correlation with the gradient chart. Since the differential recorder 35 is operated by direct current, the initial direction of any accentuated variation of the curve 49 will indicate the direction of the change in temperature, i. e., rising or falling.

The present invention is not limited to the specific construction herein shown and described, but may be made in many ways within the scope of the appended claims.

What is claimed is:

1. Apparatus for measuring temperatures in bore holes comprising: a source of alternating current, a housing adapted to be lowered in a bore hole, a pair of high temperature coefficient resistors mounted one above the other in said housing and adjacent the wall thereof, a pair of metallic rectifiers within said housing connected opposingly in series and connected in parallel with said temperature resistors, a circuit extending from said alternating current source and connected with said rectifiers in series therewith, a condenser connected in one lead of said circuit, a direct current volt meter connected across said condenser, an alternating current ammeter, means blocking direct current therein, said alternating current ammeter being connected in series with said circuit, and a path providing a shunt in said circuit between the connections thereof with said alternating current ammeter.

2. Apparatus for measuring temperatures in bore holes comprising: a source of alternating current, a housing adapted to be lowered in a bore hole, a pair of high temperature coefficient resistors mounted one above the other in said housing and adjacent the wall thereof, a pair of metallic rectifiers within said housing connected opposingly in series with each other and connected in parallel with said temperature resistors, a circuit extending from said alternating current source and connected with said rectifiers in series therewith, a condenser connected in one lead of said circuit, direct current responsive indicating means connected across said condenser, an alternating current ammeter connected in series with one lead of said circuit, means blocking direct current therein, and a path providing a shunt in said circuit between the connections thereof with said alternating current ammeter.

3. Apparatus for measuring differential temperature variations in a bore hole comprising: an alternating current source, a pair of high temperature coefficient resistors spaced one above the other and connected with each other in series, a mounting supporting said high temperature coefficient resistors in said spaced relation, a pair of rectifiers connected opposingly in series with each other, leads connecting said rectifiers in series with said alternating current source, each of said rectifiers being connected in parallel with one of said resistors respectively, a condenser connected in series with one of the leads of said alternating current source, and a D. C. volt meter connected across said condenser.

References Cited in the file of this patent

UNITED STATES PATENTS

| Number | Name | Date |
|---|---|---|
| 2,315,127 | Mounce | Mar. 30, 1943 |
| 2,508,478 | Uehling | May 23, 1950 |

FOREIGN PATENTS

| Number | Country | Date |
|---|---|---|
| 614,952 | Great Britain | Dec. 30, 1948 |